US010285345B2

United States Patent
Gong et al.

(10) Patent No.: US 10,285,345 B2
(45) Date of Patent: May 14, 2019

(54) IRRIGATION DEVICE AND SYSTEM, AND METHOD FOR USING THE SAME

(71) Applicant: Beijing University of Civil Engineering and Architecture, Beijing (CN)

(72) Inventors: Yongwei Gong, Beijing (CN); Ye Chen, Beijing (CN); Zhuangju Li, Beijing (CN); Fan Zhang, Beijing (CN); Donghai Yuan, Beijing (CN); Junqi Li, Beijing (CN); Honghong Shi, Beijing (CN)

(73) Assignee: BEIJING UNIVERSITY OF CIVIL ENGINEERING AND ARCHITECTURE, Beijing (CN)

( * ) Notice: Subject to any disclaimer, the term of this patent is extended or adjusted under 35 U.S.C. 154(b) by 0 days.

(21) Appl. No.: 15/949,038

(22) Filed: Apr. 9, 2018

(65) Prior Publication Data

US 2018/0235163 A1    Aug. 23, 2018

(30) Foreign Application Priority Data

Feb. 14, 2017   (CN) .......................... 2017 1 0079435

(51) Int. Cl.
    *A01G 25/06*    (2006.01)
    *B08B 9/08*     (2006.01)
    *A01G 25/16*    (2006.01)

(52) U.S. Cl.
    CPC .......... *A01G 25/167* (2013.01); *A01G 25/06* (2013.01); *B08B 9/0808* (2013.01); *B08B 9/0856* (2013.01); *B08B 2209/08* (2013.01)

(58) Field of Classification Search
    CPC .... A01G 25/167; A01G 25/06; B08B 9/0808; B08B 9/0856; B08B 2209/08
    See application file for complete search history.

(56) References Cited

U.S. PATENT DOCUMENTS

| | | | | |
|---|---|---|---|---|
| 5,192,426 A | * | 3/1993 | DeCoster | E03B 1/04 210/117 |
| 5,730,179 A | * | 3/1998 | Taylor | E03B 3/03 137/357 |
| 6,507,775 B1 | * | 1/2003 | Simon | A01G 25/16 137/624.11 |
| 6,887,375 B2 | * | 5/2005 | Johnson | C02F 9/00 210/170.03 |

(Continued)

*Primary Examiner* — Benjamin F Fiorello
(74) *Attorney, Agent, or Firm* — Matthias Scholl P.C.; Matthias Scholl

(57) ABSTRACT

An irrigation device, including: a rain barrel; a water pump; a humidity detector; a permeable pipe; a control unit; a first valve; a second valve; a cleaning unit. The permeable pipe includes a plurality of circumferentially-distributed bores. The rain barrel, the water pump, the first valve and the permeable pipe are connected sequentially. The humidity detector is adapted to detect a humidity of a green land. The humidity detector and the permeable pipe are disposed in the green land. The rain barrel is connected to a municipal sewage pipe via the second valve. The cleaning unit is disposed in the rain barrel for cleaning the inner wall of the rain barrel. The first valve, the second valve, the humidity detector, and the cleaning unit are all electrically connected to the control unit.

10 Claims, 2 Drawing Sheets

(56) References Cited

U.S. PATENT DOCUMENTS

| | | | | |
|---|---|---|---|---|
| 7,207,748 | B1* | 4/2007 | Urban | A01G 25/00 405/51 |
| 7,788,848 | B1* | 9/2010 | Koumoudis | A01G 9/025 47/65.9 |
| 2004/0040598 | A1* | 3/2004 | Zimmerman, Jr. | E03B 1/04 137/357 |
| 2011/0005602 | A1* | 1/2011 | Harrington | E03B 1/04 137/1 |
| 2011/0017678 | A1* | 1/2011 | Anderson | C02F 1/008 210/739 |
| 2011/0093122 | A1* | 4/2011 | Koumoudis | A01G 9/025 700/284 |
| 2011/0277852 | A1* | 11/2011 | Sly | E03B 1/041 137/357 |
| 2014/0346099 | A1* | 11/2014 | Brantley | A01G 25/00 210/127 |

\* cited by examiner

IRRIGATION DEVICE AND SYSTEM, AND METHOD FOR USING THE SAME

CROSS-REFERENCE TO RELATED APPLICATIONS

Pursuant to 35 U.S.C. § 119 and the Paris Convention Treaty, this application claims foreign priority to Chinese Patent Application No. 201710079435.3 filed Feb. 14, 2017, the contents of which and any intervening amendments thereto are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

This disclosure relates to the field of rainwater collection and utilization, and more particularly to an irrigation device and system comprising a self-cleaning rain barrel, and a method for using the irrigation device and system.

Description of the Related Art

Conventionally, residential districts are provided with rain pipes and rain barrels to collect and store rainwater for the irrigation of the green land. The rain barrel is controlled by a manual valve. The manual valve must be opened periodically, the rainwater discharged, and the rain barrels cleaned to prevent the proliferation of biological contaminants.

SUMMARY OF THE INVENTION

In view of the above-described problems, it is an objective of the invention to provide an irrigation device and system that can automatically clean the rain barrel.

To achieve the above objective, according to one embodiment of the invention, there is provided an irrigation device, comprising: a rain barrel; a water pump; a humidity detector; a permeable pipe comprising a plurality of circumferentially-distributed bores; a control unit; a first valve; a second valve; a cleaning unit. The rain barrel, the water pump, the first valve and the permeable pipe are connected sequentially. The humidity detector is adapted to detect a humidity of a green land. The humidity detector and the permeable pipe are disposed in the green land. The rain barrel is connected to a municipal sewage pipe via the second valve. The cleaning unit is disposed in the rain barrel for cleaning an inner wall of the rain barrel. The first valve, the second valve, the humidity detector, and the cleaning unit are all electrically connected to the control unit.

In a class of this embodiment, the cleaning unit comprises a plurality of brushes which are circumferentially-distributed on the inner wall of the rain barrel at interval.

In a class of this embodiment, the irrigation device further comprises turbidity detector disposed in the rain barrel and electrically connected to the control unit.

In a class of this embodiment, the irrigation device further comprises a third valve electrically connected to the control unit, and the rain barrel is connected to a tap water pipe via the third valve.

In a class of this embodiment, the irrigation device further comprises a liquid level detector disposed in the rain barrel and electrically connected to the control unit.

In a class of this embodiment, a plurality of humidity detectors is disposed in the green land along a depth direction of the soil.

In a class of this embodiment, a plurality of permeable pipes is disposed in the green land and is connected to the rain barrel via the first valve.

In another aspect, the disclosure also provides an irrigation system comprising a plurality of the abovementioned irrigation device, each irrigation device comprising a control unit, and control units being electrically connected to one another.

The disclosure also provides a method for using the irrigation device, the method comprising:

1) detecting a level of turbidity of rainwater in the rain barrel, transmitting a signal corresponding to the level of turbidity to the control unit, and then proceeding to 2);
2) determining whether the level of turbidity of the rainwater is less than a set level of turbidity, if yes, proceeding to 3), if no, proceeding to 4);
3) detecting a level of humidity of the green land, transmitting a signal corresponding to the level of humidity to the control unit, and then proceeding to 8);
4) starting and running the cleaning unit for a set time, and then proceeding to 5);
5) turning on the second valve, and proceeding to 6);
6) detecting a liquid height of the rainwater in the rain barrel, transmitting a signal corresponding to the liquid height to the control unit, and then proceeding to 7);
7) determining whether the liquid height of the rainwater is less than a first set value, if yes, turning off the second valve and proceeding to 3), if no, proceeding to 5);
8) calculating an average humidity, and proceeding to 9);
9) determining whether the average humidity is less than a set humidity, if yes, proceeding to 10), if no, proceeding to 14);
10) determining whether a number of repetitions of 3) is not greater than a set threshold, if yes, proceeding to 11), if no, proceeding to 13);
11) detecting the liquid height of the rainwater in the rain barrel, transmitting a signal corresponding to the liquid height to the control unit, and then proceeding to 12);
12) determining whether the liquid height of the rainwater is less than a second set value, if yes, turning on the third valve and proceeding to 11), if no, proceeding to 13);
13) turning on the first valve, and proceeding to 3); and
14) turning off the first valve, and proceeding to 1).

Advantages of the irrigation device and system are summarized as follows: the irrigation device and system of the disclosure comprise a self-cleaning rain barrel, and the liquid level of the rain barrel can be detected at any time, so the rainwater can be completely used for irrigation, improving the utilization of the rainwater. The turbidity detector can detect the turbidity of the rainwater and transmit a command for cleaning, ensuring the water quality for irrigation. The humidity detector can detect the humidity of the green land, so the green land can be irrigated when necessary, thus ensuring effective irrigation of the green land.

Figure 1:
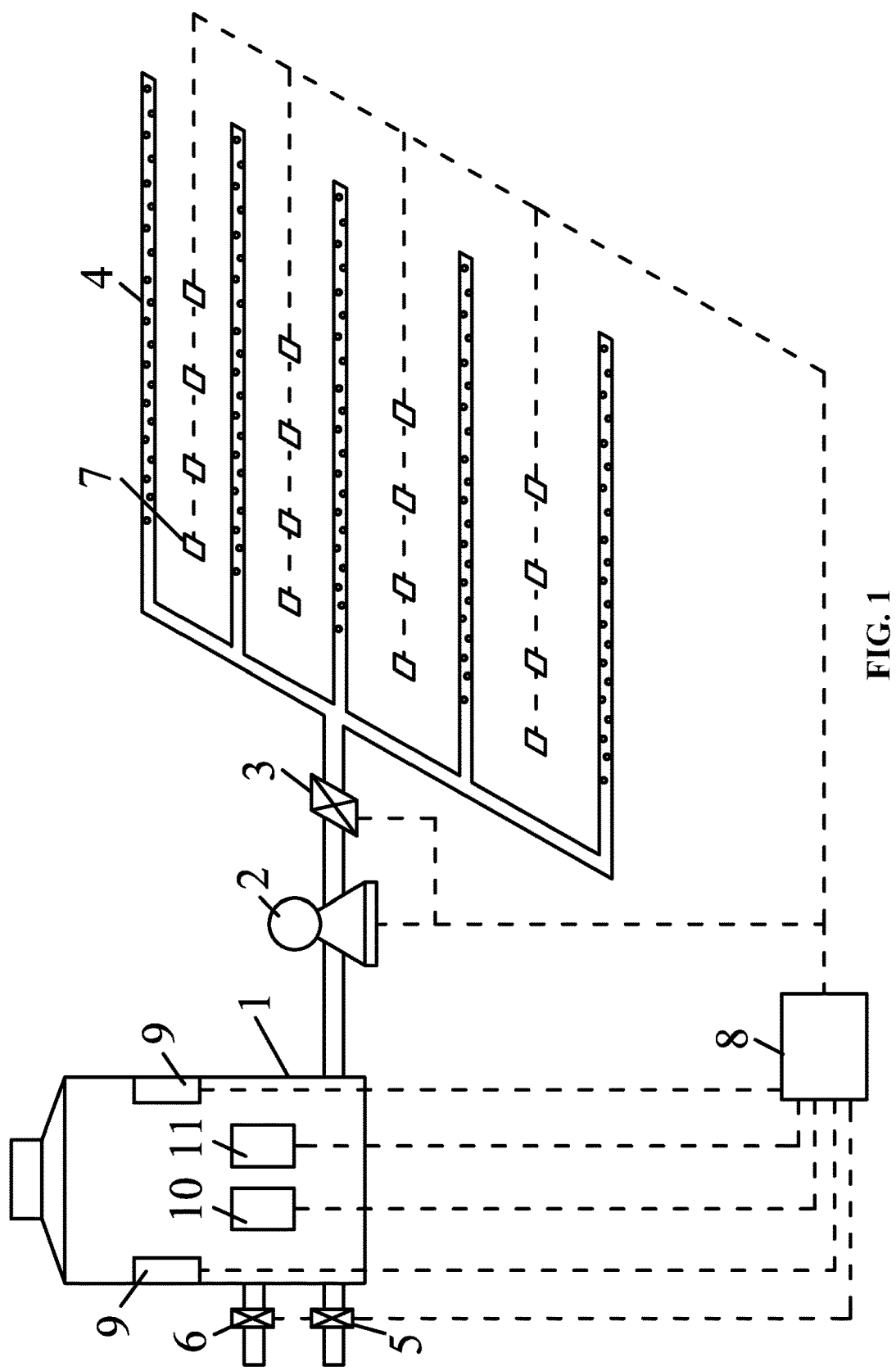
FIG. 1 is a schematic diagram of an irrigation device according to one embodiment of the disclosure.

In the drawings, the following reference numbers are used: 1. Rain barrel; 2. Water pump; 3. First valve; 4. Permeable pipe; 5. Second valve; 6. Third valve; 7. Humidity detector; 8. Control unit; 9. Cleaning unit; 10. Turbidity detector; and 11. liquid level detector.

DETAILED DESCRIPTION OF THE EMBODIMENTS

To further illustrate the invention, experiments detailing an irrigation device, an irrigation system, and a method for using the irrigation device are described below. It should be noted that the following examples are intended to describe and not to limit the invention.

Example 1

As shown in FIG. 1, the disclosure provides an irrigation device for a green land of a residential district based on a self-cleaning rainwater barrel. The irrigation device comprises a rain barrel 1; a water pump 2; a humidity detector 7; a permeable pipe 4 comprising a plurality of circumferentially-distributed bores; a control unit 8; a first valve 3; a second valve 5; a cleaning unit 9. The rain barrel 1 is connected to a plurality of rainwater collection tubes in the residential district. The humidity detector 7 and the permeable pipe 4 are disposed in a green land; the rain barrel 1, the water pump 2, the first valve 3 and the permeable pipe 4 are connected sequentially; the rain barrel 1 is connected to a municipal sewage pipe via the second valve 5; the cleaning unit 9 is disposed in the rain barrel 1 for cleaning an inner wall of the rain barrel; the first valve, the second valve, the humidity detector, and the cleaning unit 9 are all electrically connected to the control unit 8.

In use, when the humidity detector 7, that is, a humidity sensor, detects that the humidity of the green land is less than a set value, the control unit 8 controls the water pump 2 and the first valve 3 to open, and then the rainwater in the rain barrel permeates into the soil of the plants via the permeable pipe 4. When the humidity detector 7 detects that the humidity of the green land is greater than the set value, the first valve 3 is shut off. When the rain barrel 1 meets the conditions for cleaning, for example, when the humidity detector 7 detects that the humidity of the green land is greater than a set value or the first valve 3 has been closed for a set time, the control unit 8 controls the cleaning unit 9 to work, so that the cleaning unit 9 utilizes the remaining rainwater to clean the inner wall of the rain barrel 1. When the cleaning unit 9 works for a set time, the control unit 8 controls the second valve 5 to open, and then the waste water is discharged to the municipal sewage pipe via the second valve 5. Thereafter, the second valve 5 is shut off.

Preferably, the cleaning unit 9 comprises a plurality of brushes which are circumferentially-distributed on the inner wall of the rain barrel 1 at interval. When the rain barrel 1 requires cleaning, the control unit 8 controls all the brushes to work, to eliminate the impurities such as moss on the inner wall of the rain barrel 1. The impurities fall into the water, and then are discharged in the municipal sewage pipe along with the rainwater.

Furthermore, the irrigation device further comprises a turbidity detector 10 which is disposed in the rain barrel 1 and electrically connected to the control unit 8. When the turbidity detector 10 detects that the turbidity of the rainwater is greater than a set turbidity, the control unit 8 controls the cleaning unit 9 to work. When the turbidity detector 10 detects that the turbidity of the rainwater is less than a set turbidity, the rainwater in the rain barrel is clean and can stored for next irrigation, and the rain barrel 1 does not require cleaning through the rainwater. Thus, the quality of the rainwater in the rain barrel is guaranteed, the service life of the rain barrel is prolonged, preventing the waste of the rainwater, and improving the utilization of the rainwater.

Furthermore, the irrigation device further comprises a liquid level detector 11 disposed in the rain barrel 1 and electrically connected to the control unit 8. Advantages of the arrangement lie in that: on one hand, when the second valve 5 is opened to discharge waste water, the liquid level detector 11 can detect whether the waste water is completely discharged, thus preventing the pollution of the future collected rainwater; on the other hand, when the green land requires watering, the liquid level detector 11 can detect whether the rain barrel 1 has sufficient water for watering. If the water is insufficient, the third valve 6 is opened for supplying water, thus ensuring the timely irrigation of the green land.

Preferably, a plurality of humidity detectors 7 is disposed in the green land according to the depth direction of the soil. Particularly, the plurality of humidity detectors 7 are disposed at different horizontal positions. The detection results of the plurality of humidity detectors 7 are averaged, which is beneficial to accurately reflecting the actual conditions of the entire green land.

Preferably, four permeable pipes 4 are disposed in the green land and are connected to the rain barrel via the first valve.

Example 2

The disclosure also provides an irrigation system based on a self-cleaning rainwater barrel. The irrigation system comprises a plurality of the irrigation devices in Example 1, each irrigation device comprises a control unit 8, and the control units are electrically connected to one another.

The structure and work principle of the irrigation device have been described in Example 1, to avoid repetition, there is no need to describe in this example. It should be noted that, each control unit 8 in this example can be a part of a central processing unit, or an independent controller. In addition, the plurality of control units 8 can operate synchronously, or operate one by one in a preset order.

Example 3

Figure 2:
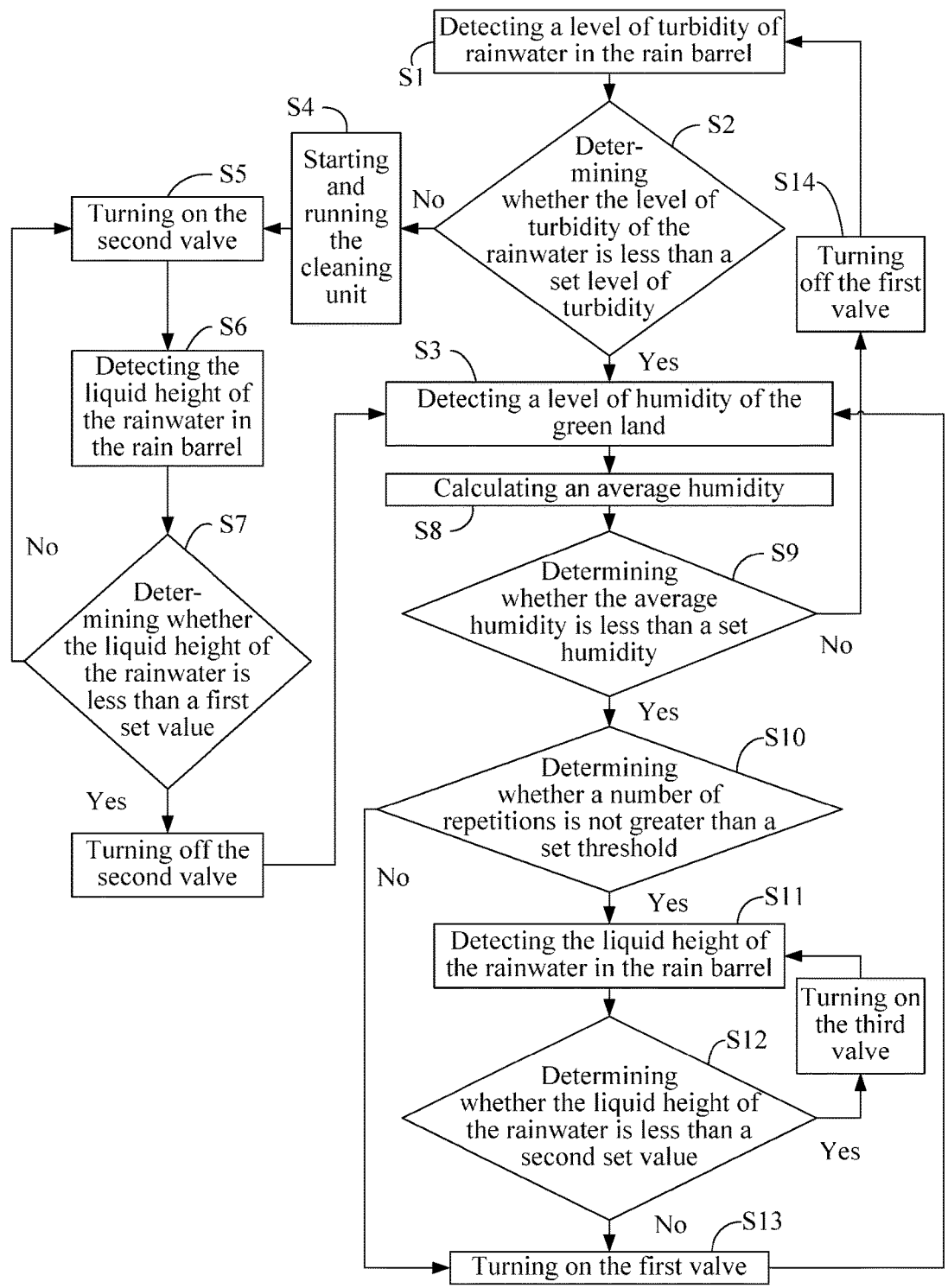
FIG. 2 is a flow chart of using an irrigation device according to one embodiment of the disclosure.

As shown in FIG. 2, the disclosure also provides a method for using the irrigation device. The method comprises:
1) detecting a level of turbidity of rainwater in the rain barrel, transmitting a signal corresponding to the level of turbidity to the control unit 8, and then proceeding to 2);
2) determining whether the level of turbidity of the rainwater is less than a set level of turbidity, if yes, proceeding to 3), if no, proceeding to 4);
3) detecting a level of humidity of the green land, transmitting a signal corresponding to the level of humidity to the control unit, and then proceeding to 8);
4) starting and running the cleaning unit for a set time, and then proceeding to 5);
5) turning on the second valve, and proceeding to 6);
6) detecting a liquid height of the rainwater in the rain barrel, transmitting a signal corresponding to the liquid height to the control unit, and then proceeding to 7);

7) determining whether the liquid height of the rainwater is less than a first set value, if yes, turning off the second valve and proceeding to 3), if no, proceeding to 5);

8) calculating an average humidity, and proceeding to 9);

9) determining whether the average humidity is less than a set humidity, if yes, proceeding to 10), if no, proceeding to 14);

10) determining whether a number of repetitions of 3) is not greater than a set threshold, if yes, proceeding to 11), if no, proceeding to 13);

11) detecting the liquid height of the rainwater in the rain barrel, transmitting a signal corresponding to the liquid height to the control unit, and then proceeding to 12);

12) determining whether the liquid height of the rainwater is less than a second set value, if yes, turning on the third valve and proceeding to 11), if no, proceeding to 13);

13) turning on the first valve, and proceeding to 3); and 14) turning off the first valve, and proceeding to 1).

Specifically, in 10), the set threshold is 1.

Specifically, in 8), the average humidity is arithmetical average or weighted average. When it is a weighted average, the average humidity is calculated according to the following formula:

$$w = \sum_{i=1}^{k} w_i * x_i, 1 = 1, 2 \ldots K;$$

where K denotes a detected humidity value, $w_i$ denotes an $i^{th}$ humidity; $x_i$ denotes a weight corresponding to the $i^{th}$ humidity. The weight of a humidity is related to the position of the humidity detector 7 that shows the humidity, for example, the insertion depth of the humidity detector 7 in the soil, the light intensity of the insertion point of the humidity detector 7 in the soil, and whether the insertion point of the humidity detector 7 in the soil is a windward side. When the humidity detector 7 is buried on the surface of the soil, at the sunny side, or at the windward side, the water in the green land is easily evaporated, so that the humidity read by the humidity detector 7 is relatively small. On the contrary, the water in the deep soil, at the night side, or at the leeward side of the green land is sufficient, the detected humidify is relatively large, so there is no need to irrigate. Based on the factors, the weight of the humidity detected on the surface of the soil, at the sunny side, and at the windward side of the green land can be set as being lower than that of the humidity detected on the deep soil, at the night side, and at the leeward side of the green land, so that the calculated average humidity can denote the actual humidity of the entire region, which ensures the irrigation requirement of the entire green land, saves the water source, and improves the water utilization.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An irrigation device, comprising:
   1) a rain barrel;
   2) a water pump;
   3) a humidity detector;
   4) a permeable pipe comprising a plurality of circumferentially-distributed bores;
   5) a control unit;
   6) a first valve;
   7) a second valve;
   8) a cleaning unit;
   wherein:
   the rain barrel, the water pump, the first valve and the permeable pipe are connected sequentially;
   the humidity detector is adapted to detect a humidity of a green land;
   the humidity detector and the permeable pipe are disposed in the green land;
   the rain barrel is connected to a municipal sewage pipe via the second valve;
   the cleaning unit is disposed in the rain barrel for cleaning an inner wall of the rain barrel; and
   the first valve, the second valve, the humidity detector, and the cleaning unit are all electrically connected to the control unit.

2. The device of claim 1, wherein the cleaning unit comprises a plurality of brushes which are circumferentially-distributed on the inner wall of the rain barrel at interval.

3. The device of claim 1, further comprising turbidity detector disposed in the rain barrel and electrically connected to the control unit.

4. The device of claim 1, further comprising a third valve electrically connected to the control unit, and the rain barrel being connected to a tap water pipe via the third valve.

5. The device of claim 4, further comprising a liquid level detector disposed in the rain barrel and electrically connected to the control unit.

6. The device of claim 1, wherein a plurality of humidity detectors is disposed in the green land along a depth direction of the soil.

7. The device of claim 1, wherein a plurality of permeable pipes is disposed in the green land and is connected to the rain barrel via the first valve.

8. An irrigation system comprising a plurality of the irrigation devices of claim 1, each irrigation device comprising a control unit, and control units being electrically connected to one another.

9. A method for using the irrigation device of claim 1, the method comprising:
   1) detecting a level of turbidity of rainwater in the rain barrel, transmitting a signal corresponding to the level of turbidity to the control unit, and then proceeding to 2);
   2) determining whether the level of turbidity of the rainwater is less than a set level of turbidity, if yes, proceeding to 3), if no, proceeding to 4);
   3) detecting a level of humidity of the green land, transmitting a signal corresponding to the level of humidity to the control unit, and then proceeding to 8);
   4) starting and running the cleaning unit for a set time, and then proceeding to 5);
   5) turning on the second valve, and proceeding to 6);
   6) detecting a liquid height of the rainwater in the rain barrel, transmitting a signal corresponding to the liquid height to the control unit, and then proceeding to 7);

7) determining whether the liquid height of the rainwater is less than a first set value, if yes, turning off the second valve and proceeding to 3), if no, proceeding to 5);
8) calculating an average humidity, and proceeding to 9);
9) determining whether the average humidity is less than a set humidity, if yes, proceeding to 10), if no, proceeding to 14);
10) determining whether a number of repetitions of 3) is not greater than a set threshold, if yes, proceeding to 11), if no, proceeding to 13);
11) detecting the liquid height of the rainwater in the rain barrel, transmitting a signal corresponding to the liquid height to the control unit, and then proceeding to 12);
12) determining whether the liquid height of the rainwater is less than a second set value, if yes, turning on the third valve and proceeding to 11), if no, proceeding to 13);
13) turning on the first valve, and proceeding to 3); and
14) turning off the first valve, and proceeding to 1).

10. The method of claim 9, wherein in 10), the set threshold is 1.

\* \* \* \* \*